United States Patent
Zhang

(10) Patent No.: US 11,675,479 B2
(45) Date of Patent: Jun. 13, 2023

(54) LIST DISPLAY METHOD AND APPARATUS, COMPUTER DEVICE AND COMPUTER-READABLE MEDIUM

(71) Applicant: BOE TECHNOLOGY GROUP CO., LTD., Beijing (CN)

(72) Inventor: Zhe Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 6 days.

(21) Appl. No.: 17/298,109

(22) PCT Filed: May 14, 2020

(86) PCT No.: PCT/CN2020/090211
§ 371 (c)(1),
(2) Date: May 28, 2021

(87) PCT Pub. No.: WO2020/228765
PCT Pub. Date: Nov. 19, 2020

(65) Prior Publication Data
US 2022/0035491 A1 Feb. 3, 2022

(30) Foreign Application Priority Data
May 14, 2019 (CN) .......................... 201910398910.2

(51) Int. Cl.
*G06F 3/0482* (2013.01)
*G06F 3/04815* (2022.01)

(52) U.S. Cl.
CPC ........ *G06F 3/0482* (2013.01); *G06F 3/04815* (2013.01)

(58) Field of Classification Search
CPC ....... G06F 3/0482; G06F 3/04815; G06F 8/38
See application file for complete search history.

(56) References Cited

U.S. PATENT DOCUMENTS 9,684,636 B2 6/2017 Liang et al.
2002/0129096 A1* 9/2002 Mansour ................. G06F 9/451
715/740

(Continued)

FOREIGN PATENT DOCUMENTS

CN 107295420 A 10/2017

OTHER PUBLICATIONS

Xiancheng, "RecyclerView adapter that supports multiple types of items", Jan. 29, 2018.
Kururunga, "RecycleView multi-type layout", May 2, 2018.

*Primary Examiner* — Ryan F Pitaro
(74) *Attorney, Agent, or Firm* — Houtteman Law LLC

(57) ABSTRACT

The present disclosure provides a list display method, including: creating a type cache pool, the type cache pool caches: a correspondence between structure types of a plurality of types of data and items corresponding to the respective structure types; and respective layout information is recorded in each item, acquiring the structure type of each data in a list; displaying the respective data to be displayed in a region to be displayed in the list, step of displaying the respective data to be displayed includes steps of: determining the item corresponding to the structure type of the data to be displayed according to the correspondence; displaying the data to be displayed according to the layout information of the item corresponding to the structure type of the data to be displayed; wherein the region to be displayed is a region to be displayed on a screen in the list.

14 Claims, 5 Drawing Sheets

(56) References Cited

U.S. PATENT DOCUMENTS

2017/0277362 A1* 9/2017 Li .................... G06F 3/0481
2019/0065022 A1* 2/2019 Rocha ............... G06F 12/0893

* cited by examiner

LIST DISPLAY METHOD AND APPARATUS, COMPUTER DEVICE AND COMPUTER-READABLE MEDIUM

CROSS REFERENCE TO RELATED APPLICATIONS

The present application claims the priority of the Chinese Patent Application No. 201910398910.2 filed on May 14, 2019, the content of which is incorporated herein by reference in its entirety.

TECHNICAL FIELD

The present disclosure relates to the field of computer, and in particular, to a list display method and apparatus, a computer device, and a computer-readable medium.

BACKGROUND

In an API (Application Programming Interface) control of an existing Android system, a RecyclerView is used to display data. Due to design limitations of the RecyclerView, only the same type of data structure and a layout of a corresponding layout structure can be displayed, and the same RecyclerView cannot be used to display multiple types of data structures and multiple layout structures.

SUMMARY

The present disclosure provides a list display method and apparatus, a computer device, and a computer-readable medium.

The list display method provided by the present disclosure includes steps of:

creating a type cache pool, wherein the type cache pool caches: a correspondence between structure types of a plurality of types of data and items corresponding to the respective structure types; and respective layout information is recorded in each item, acquiring the structure type of each data in a list;

displaying the respective data to be displayed in a region to be displayed in the list, wherein the step of displaying the respective data to be displayed includes steps of:

determining the item corresponding to the structure type of the data to be displayed according to the correspondence between the structure types of the plurality of types of data and the items corresponding to the respective structure types cached in the type cache pool;

displaying the data to be displayed according to the layout information of the item corresponding to the structure type of the data to be displayed;

wherein the region to be displayed is a region to be displayed on a screen in the list.

Optionally, the region to be displayed is an initial part of the list, and the step of displaying the data to be displayed according to the layout information of the item corresponding to the structure type of each data to be displayed includes steps of:

creating a Viewholder corresponding to the item according to the item corresponding to the structure type of the data to be displayed; and calling the Viewholder corresponding to the data to be displayed so that the Viewholder renders the data to be displayed on the screen according to the layout information of the item corresponding to the structure type of the data to be displayed.

Optionally, the type cache pool further caches: a correspondence between the item type value and the item;

before the step of calling the Viewholder corresponding to the data to be displayed so that the Viewholder renders the data to be displayed on the screen according to the layout information of the item corresponding to the structure type of the data to be displayed, the list display method further includes steps of:

obtaining the item type value corresponding to the structure type of the data to be displayed according to the correspondence between the item type value and the item; and transmitting the item type value corresponding to the structure type of the data to be displayed to the Viewholder corresponding to the data to be displayed so as to bind the Viewholder and the item type value; wherein when the Viewholder renders the data to be displayed on the screen according to the layout information of the item corresponding to the structure type of the data to be displayed, the data to be displayed is rendered according to the layout information of the item corresponding to the item type value bound with the Viewholder.

Optionally, the step of creating a type cache pool includes steps of:

creating a first cache set and a second cache set; and sequentially registering and binding the structure types of the plurality of types of data and the items corresponding to the structure types into the first cache set; wherein every time the structure type of a type of data among the plurality of types of data and the item corresponding to the structure type have been registered and bound, a size of the first cache set at a current time is used as the item type value of the item, and the item and the item type value thereof are bound and then cached in the second cache set.

Optionally, the type cache pool is further provided with: a first member method and a second member method, wherein the first member method is a method for obtaining a corresponding item according to the item type value; and the second member method is a method for obtaining the item type value corresponding to the structure type of the data to be displayed.

Optionally, after the step of transmitting the item type value corresponding to the structure type of the data to be displayed to the Viewholder corresponding to the data to be displayed, the list display method further includes: storing the Viewholder and the corresponding item type value into a Recycler cache pool.

Optionally, the region to be displayed is a region being displayed on the screen when the list is pulled up or down, the step of determining the item corresponding to the structure type of the data to be displayed according to the correspondence between the structure types of the plurality of types of data and the items corresponding to the respective structure types cached in the type cache pool includes steps of:

acquiring the item type value corresponding to the structure type of the data to be displayed;

when the item type value equal to the item type value corresponding to the structure type of the data to be displayed exists in the Recycler cache pool, calling the Viewholder corresponding to the item type value so that the Viewholder determines the item corresponding to the structure type of the data to be displayed according to the item type value; wherein the Viewholder called in the step is denoted as a reused Viewholder;

the step of displaying the data to be displayed according to the layout information of the item corresponding to the structure type of the data to be displayed includes rendering the data to be displayed on the screen by the reused Viewholder according to the layout information of the determined item.

Optionally, prior to the step of creating a type cache pool, the list display method further includes: customizing the items corresponding to the structure types of the plurality of types of data.

Optionally, the initial part is a part being displayed on the screen, starting from a top of the list, when the list is not pulled down.

Accordingly, the present disclosure also provides a list display apparatus including:

a cache pool creating module configured to create a type cache pool, wherein the type cache pool caches: a correspondence between structure types of a plurality of types of data and items corresponding to the respective structure types, and respective layout information is recorded in each item;

a data type acquiring module configured to acquire the structure type of each data in the list; and an adapter configured to display the respective data to be displayed in a region to be displayed in the list; wherein when each data to be displayed is displayed, the adapter is configured to determine the item corresponding to the structure type of the data to be displayed according to the correspondence between the structure types of the plurality of types of data and the items corresponding to the respective structure types cached in the type cache pool; and display the data to be displayed according to the layout information of the item corresponding to the structure type of the data to be displayed;

wherein the region to be displayed is a region to be displayed on a screen in the list.

Optionally, the adapter includes:

a Viewholder creating unit configured to create a Viewholder corresponding to the item according to the item corresponding to the structure type of the data to be displayed, when the region to be displayed is an initial part of the list;

a rendering unit configured to call the Viewholder corresponding to the data to be displayed, so that the Viewholder renders the data to be displayed on the screen according to the layout information of the item corresponding to the structure type of the data to be displayed.

Optionally, the type cache pool further caches: a correspondence between the item type value and the item;

the adapter further includes:

a first type value acquiring unit configured to acquire the item type value corresponding to the structure type of each data to be displayed according to the correspondence between the item type value and the item, when the region to be displayed is the initial part of the list;

a Viewholder binding unit configured to transmit the item type value corresponding to the structure type of the data to be displayed to the Viewholder corresponding to the data to be displayed so as to bind the Viewholder and the item type value, when the region to be displayed is the initial part of the list, wherein when the Viewholder renders the data to be displayed on the screen according to the layout information of the item corresponding to the structure type of the data to be displayed, the data to be displayed is rendered according to the layout information of the item corresponding to the item type value bound with the Viewholder.

Optionally, the cache pool creating module includes:

a set creating unit configured to create a first cache set and a second cache set;

an item binding unit configured to sequentially register and bind the structure types of the plurality of types of data and the items corresponding to the structure types into the first cache set; wherein every time the structure type of a type of data among the plurality of types of data and the item corresponding to the structure type have been registered and bound, a size of the first cache set at a current time is used as the item type value of the item, and the item and the item type value thereof are bound and then cached in the second cache set.

Optionally, the type cache pool further caches: a first member method and a second member method, wherein the first member method is a method for obtaining a corresponding item according to the item type value;

the second member method is a method for obtaining the item type value corresponding to the structure type of the data to be displayed.

Optionally, the adapter further includes:

a storage unit configured to store the Viewholder and the corresponding item type value into a Recycler cache pool after the Viewholder binding unit binds the Viewholder and the item type value;

a second type value acquiring unit configured to acquire the item type value corresponding to the structure type of data to be displayed when the region to be displayed is a region being displayed on the screen when the list is pulled up or down;

a judging unit configured to judge whether an item type value equal to the item type value obtained by the second type value acquiring unit exists in the Recycler cache pool, when the region to be displayed is a region being displayed on the screen when the list is pulled up or down; if so, the rendering unit calls the Viewholder corresponding to the item type value.

Optionally, the list display apparatus further includes: an item customizing module configured to customize items corresponding to the structure types of the plurality of types of data.

Accordingly, the present disclosure also provides a computer device including a memory and a processor, the memory having stored thereon a computer program, wherein the computer program, when executed by the processor, implements the list display method as described above.

Accordingly, the present disclosure also provides a computer-readable medium having stored thereon a computer program, wherein the computer program, when executed by a processor, implements the list display method as described above.

BRIEF DESCRIPTION OF DRAWINGS

Drawings, which are included to provide a further understanding of the present disclosure and constitute a part of this specification, illustrate the present disclosure together with the following embodiments, but do not constitute a limitation of the present disclosure. In the drawings.

DETAIL DESCRIPTION OF EMBODIMENTS

The embodiments of the present disclosure will be described below in detail in conjunction with the drawings. It should be understood that the described embodiments here are only to explain and illustrate the present disclosure, not to limit the present disclosure.

Figure 1:
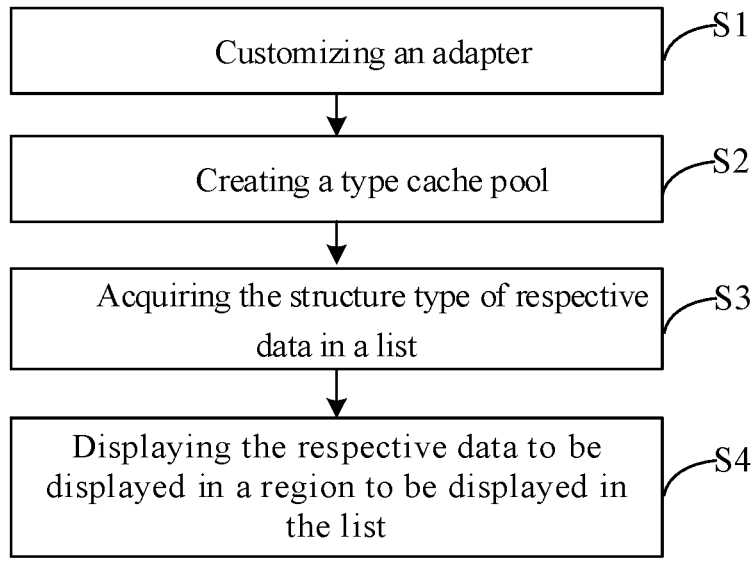
FIG. 1 is a flowchart of a list display method provided by an embodiment of the present disclosure.

FIG. 1 is a flowchart illustrating a list display method provided in the present disclosure. As shown in FIG. 1, the list display method includes the following steps:

S1, customizing an adapter, which is configured to process data with various structure types. The adapter inherits an adapter of the RecyclerView. In addition, the adapter includes attributes and methods in a native adapter of the Android, and also provides a method for adding a correspondence between a structure type of data and an item to a type cache pool in step S2.

S2, creating a type cache pool, wherein the type cache pool caches: a correspondence between structure types of a plurality of data and items (Itemview) corresponding to the respective structure types. Layout information is recorded in each item, and includes information such as ID, position and type of a layout file, and a method for acquiring the information is also provided.

S3, acquiring the structure type of respective data in a list.

The respective data is data to be displayed on a screen and forming one item of the list. For example, the data is data including character strings and pictures.

S4, displaying the respective data to be displayed in a region to be displayed in the list.

The step S4 may be performed by the adapter in the step S1. The region to be displayed is a region to be displayed on the screen in the list. For example, when the list is not pulled down, the region to be displayed in the list is: a part that may be displayed on the screen, starting from a top of the list (this part will be referred to as an initial part of the list hereinafter). The data to be displayed is: data to be displayed on the screen.

Figure 2:
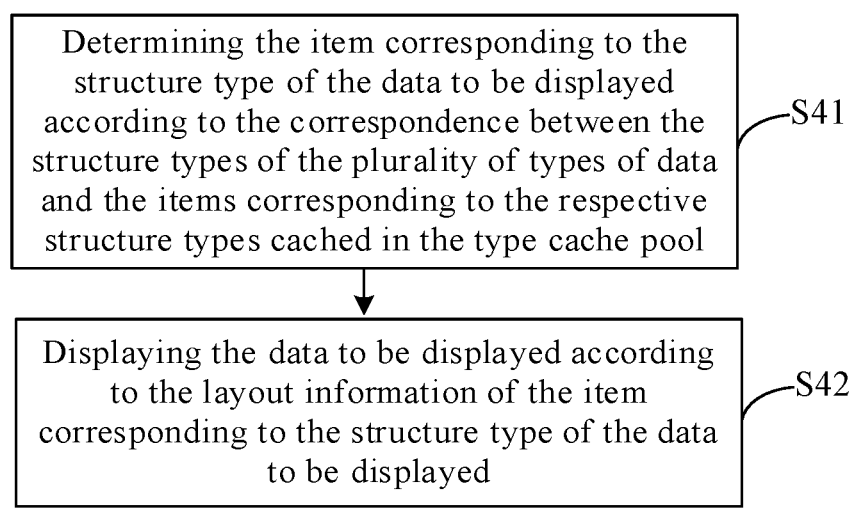
FIG. 2 is a schematic diagram illustrating a displaying process for each data to be displayed in step S4 of the present disclosure.

FIG. 2 is a schematic diagram illustrating a displaying process for each data to be displayed in step S4 of the present disclosure. As shown in FIG. 2, a displaying step for each data to be displayed includes the following steps:

S41, determining the item corresponding to the structure type of the data to be displayed according to the correspondence between the structure types of the plurality of types of data and the items corresponding to the respective structure types cached in the type cache pool.

S42, displaying the data to be displayed according to the layout information of the item corresponding to the structure type of the data to be displayed. In the present disclosure, by a cache mechanism in the type cache pool, structure types of respective data are bindingly (i.e., associatively) stored with corresponding items. When the list is displayed, the layout information of the item corresponding to the structure type of the data to be displayed is acquired according to the correspondence in the cache, thereby displaying according to the corresponding layout information. Therefore, the present disclosure may display the list having the data of the plurality of structure types by using the same RecyclerView control. In addition, in the type cache pool, data with the same structure type and items only need to be created once, so that a phenomenon of memory waste may be avoided.

Figure 3:
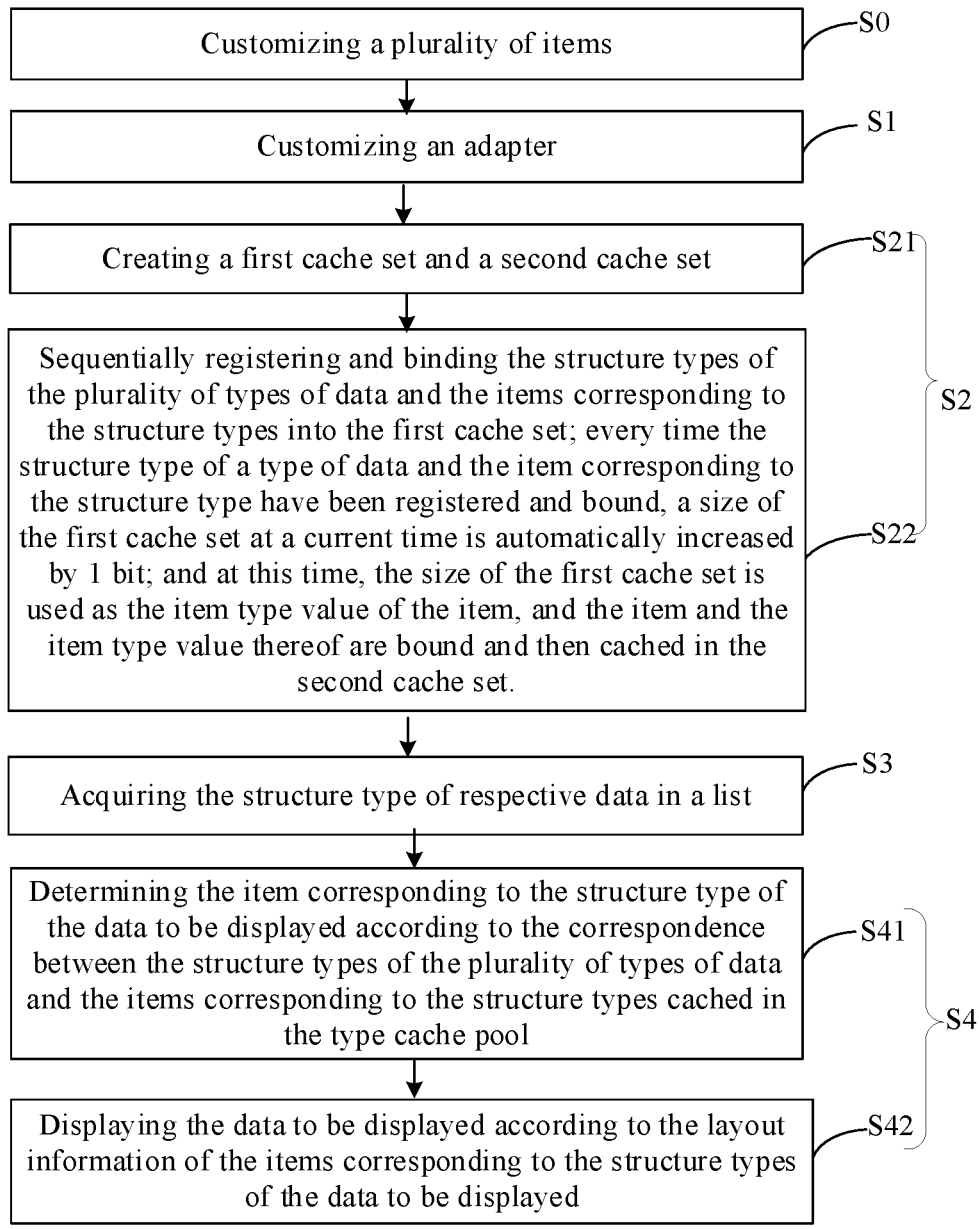
FIG. 3 is a flowchart of a list display method provided by an embodiment of the present disclosure.

FIG. 3 is a flowchart of a list display method provided in an embodiment of the present disclosure. As shown in FIG. 3, the list display method includes following steps:

S0, customizing a plurality of items, wherein the plurality of items respectively correspond to the structure types of the plurality of data.

Each item is a customized class with genericity, and the genericity in the customized class corresponds to the structure type or data source of the data to be bound. The layout information of the item is recorded in the customized item through attributes, and a method for acquiring the layout information from the outside is provided. The layout information includes the ID, location, type of the layout file (e.g., sub-control in the item corresponding to text, picture, etc.).

S1, customizing an adapter, which is configured to process data with various structure types. The adapter inherits an adapter of the RecyclerView. In addition, the adapter includes attributes and methods in a native adapter of the Android, and also includes a method for registering the correspondence between the structure type of the bound data and the items into the type cache pool; and a method for creating and binding Viewholder. The method for binding Viewholder is a method for acquiring items corresponding to corresponding item type values from the type cache pool.

In a practical application, a method of associating and extending events may be performed on the customized adapter and the customized item, so that the expandability is enhanced. For example, relevant code for pull-up and pull-down refreshes may be added to the customized adapter, and various animation effects involved may be customized. For example, with customized items, some click and touch events (e.g., single item left-slide deletion or dragging effects) may be associated for extension.

S2, creating a type cache pool, wherein the type cache pool caches: a correspondence between structure types of a plurality of data and items corresponding to the respective structure types. The type cache pool further caches: a correspondence between the item type value and the item.

Specifically, step S2 includes steps S21 and S22:

S21, creating a first cache set and a second cache set.

S22, sequentially registering and binding the structure types of the plurality of data and the items corresponding to the structure types into the first cache set (i.e., adding the correspondence between the structure type of each data and the corresponding item into the first cache set). Every time the structure type of data and the item corresponding to the structure type have been registered and bound, a size of the first cache set is automatically increased by 1 bit. At this time, the size of the first cache set is used as the item type value of the item, and the item and the item type value thereof are bound (i.e., associated) and then cached in the second cache set. The first cache set may adopt an ArrayMap set in the Android system, and the second cache set may adopt a SparseArray set which saves more memory.

When each list is displayed, a type cache pool may be created. Moreover, when each list is displayed, what kind of structure type of data needs to be displayed in the whole list may be acquired from the server in advance.

In addition, a first member method (getitemview( )) and a second member method (getitemviewtype( )) are also provided in the type cache pool. The first member method is: a method for obtaining corresponding items according to the item type values; the second member method is: a method for obtaining the item type value corresponding to the structure type of the data to be displayed. In the second member method, the data is taken as an incoming object, and an object.getClass( )of the incoming object is called to acquire a class type (i.e. the structure type of the data); and a corresponding customized item is acquired in the first cache set, and the item type value is obtained in the second cache set according to the item. In the first member method, previously cached items are obtained from the second cache set according to incoming parameters (i.e., item type values).

In addition, a method that need to be called in the adapter is also provided in the type cache pool, the method is registering the correspondence between the structure type of the bound data and the item. In the method, the structure type of the data and the corresponding item are bound and then stored in the first cache set, and the size of the first cache set when the corresponding item is stored and the corresponding item are bound and cached in the second cache set, thereby completing the cache process. While the cache process is completed, a method for setting a maximum number of reused items needs to be provided, and in the method, the maximum number of item type values cached in a Recycler cache pool (RecyclerViewPool) of an Android system is set.

S3, acquiring the structure type of respective data in a list. For example, when the data is data including a title and a picture, the data is of a first structure type; when the data is data including a title, a plurality of pictures, and time, the data is of a second structure type, and so on.

S4, displaying the respective data to be displayed in a region to be displayed in the list.

A length of the list may be smaller than a length of the screen of the display device, so that the list may be completely displayed on one screen. Alternatively, the length of the list may be larger than the length of the screen, so that the initial part of the list is displayed first; when a pull-up or pull-down operation occurs, the data structure newly added to the screen is displayed.

The step of displaying each data to be displayed includes the following steps:

S41, determining the item corresponding to the structure type of the data to be displayed according to the correspondence between the structure types of the plurality of types of data and the items corresponding to the structure types cached in the type cache pool.

S42, displaying the data to be displayed according to the layout information of the items corresponding to the structure types of the data to be displayed.

Each data may be rendered on the screen by using the Viewholder, and when each data to be displayed is displayed when the region to be displayed is the initial part of the list, the Viewholder corresponding to the data to be displayed may be newly established; the region to be displayed is a region being displayed on the screen when the list is pulled up and down, and when each data to be displayed is displayed, the Viewholder in the display process for the initial part of the list may be reused.

Figure 4:
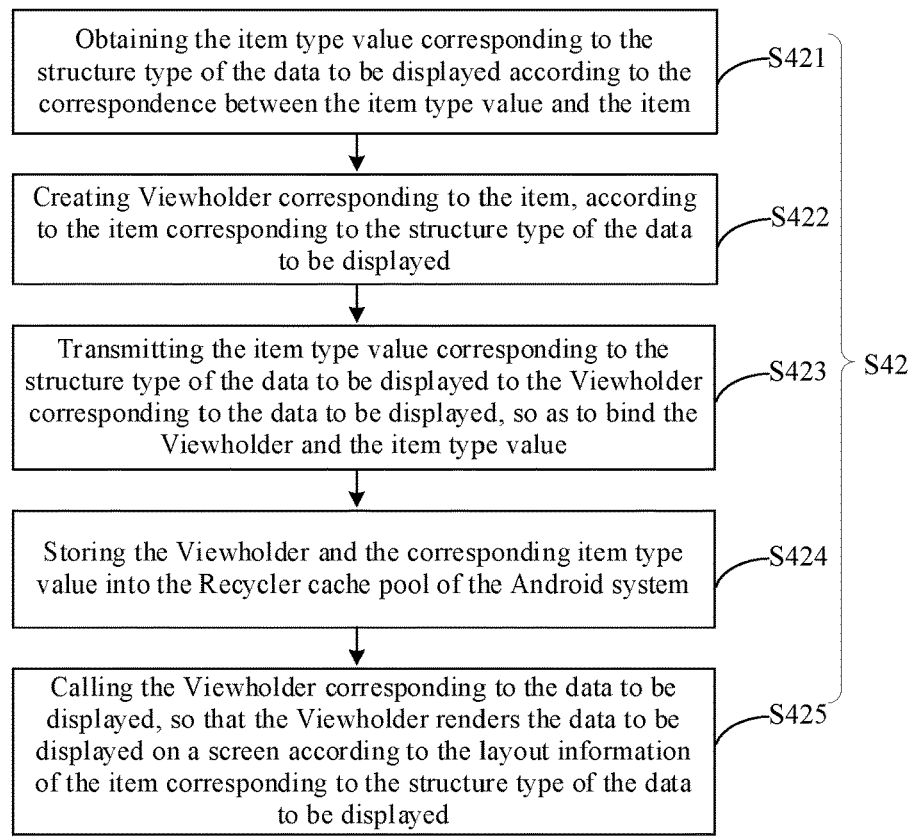
FIG. 4 is a flowchart illustrating the step S42 for displaying each data to be displayed in an initial part of a list according to the present disclosure.

FIG. 4 is a flowchart illustrating the step S42 for displaying each data to be displayed in the initial part of the list. As shown in FIG. 4, when the region to be displayed is the initial part of the list, step S42 includes steps of:

S421, obtaining the item type value corresponding to the structure type of the data to be displayed according to the correspondence between the item type value and the item. Specifically, when the data to be displayed is data in the initial part of the list, steps S41 and S421 may call a getitemviewtype( ) method. The item corresponding to the structure type of each data is obtained according to the correspondence of the first cache set, and then, the item type value is obtained according to the correspondence of the second cache set.

S422, creating Viewholder corresponding to the item, according to the item corresponding to the structure type of the data to be displayed.

S423, transmitting the item type value corresponding to the structure type of the data to be displayed to the Viewholder corresponding to the data to be displayed, so as to bind the Viewholder and the item type value.

S424, storing the Viewholder and the corresponding item type value into the Recycler cache pool of the Android system.

S425, calling the Viewholder corresponding to the data to be displayed, so that the Viewholder renders the data to be displayed on a screen according to the layout information of the item corresponding to the structure type of the data to be displayed.

When the Viewholder renders the data to be displayed on the screen according to the layout information of the item corresponding to the structure type of the data to be displayed, the data to be displayed is rendered according to the layout information of the item corresponding to the item type value bound with the Viewholder.

The item corresponding to each item type value may be acquired by calling the first member method, and the first member method determines the item corresponding to the item type value bound with the Viewholder in the Recycler cache pool according to the correspondence between the item cached in the second cache set and the item type value.

It should be noted that step S424 and step S425 may not be consecutive, and after S424 is finished, the Android system may perform another process, and then continue to perform step S425.

In addition, the layout information in the item further includes height information; in a practical display process, after the structure types of M pieces of data of the list are acquired, the item corresponding to each data is sequentially determined; every time an item corresponding to one piece of data is determined, whether the data to be displayed exceeds the screen is judged according to the height information in the item and a screen size; if the data to be displayed does not exceed the screen, a Viewholder is newly created, and the data to be displayed is rendered on the screen by using the Viewholder; when a sum of heights of the items corresponding to previous N pieces of data reaches a height of the screen, the initial part of the list is considered to be capable of displaying the previous N pieces of data; then, when displaying the data after the nth piece of data, the created Viewholder may be reused to display the data to be displayed.

Figure 5:
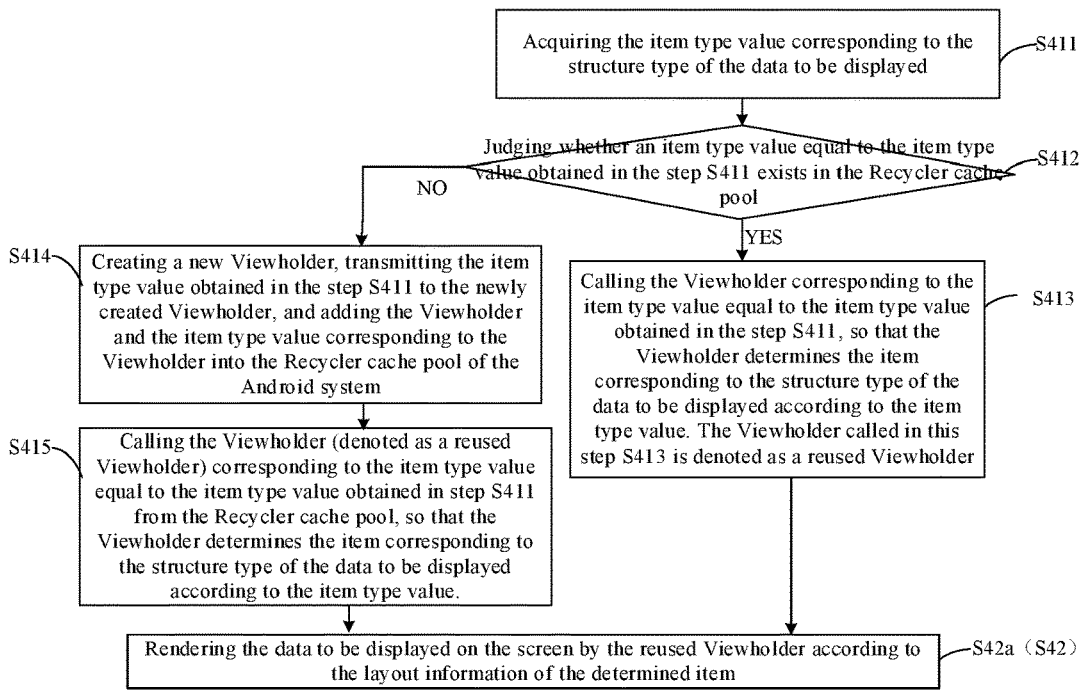
FIG. 5 is a flowchart for displaying each data to be displayed in the region being displayed on the screen when the list is pulled up or down according to the present disclosure.

FIG. 5 is a flowchart for displaying each data to be displayed in the region being displayed on the screen when the list is pulled up or down according to the present disclosure. As shown in FIG. 5, when the region to be displayed is the region being displayed on the screen when the list is pulled up or down, the step for displaying each data to be displayed includes step S41 and step S42.

Step S41 includes following steps:

S411, acquiring the item type value corresponding to the structure type of the data to be displayed.

For example, the initial part of the list may display N pieces of data. When the list is pulled up or down, that is, when the N+ith piece of data is to be displayed on the screen, the item type value corresponding to the data type of the N+ith piece of data is acquired. Where i is an integer greater than 0, and N+i is no greater than the total number of data in the list. In step S411, the adapter may inherit an original method for acquiring the item type value in the Android system by using a callback method. The original method may directly obtain the item type value corresponding to the N+ith piece of data.

S412, judging whether an item type value equal to the item type value obtained in the step S411 exists in the Recycler cache pool; if so, it proceeds to step S413; otherwise, it proceeds to step S414.

S413, calling the Viewholder corresponding to the item type value equal to the item type value obtained in the step S411, so that the Viewholder determines the item corresponding to the structure type of the data to be displayed according to the item type value. The Viewholder called in this step S413 is denoted as a reused Viewholder.

Exemplarily, if the item type value obtained in step S411 is equal to the item type value of the 3rd item in the initial part of the list, the Viewholder corresponding to the item type value of the 3rd item in the initial part of the list is called.

S414, creating a new Viewholder, transmitting the item type value obtained in the step S411 to the newly created Viewholder, and associating (binding) the Viewholder and the item type value corresponding to the Viewholder with each other, and then adding the Viewholder and the item type value into the Recycler cache pool of the Android system.

After that, the Android system may process other processes, and then proceed to S415:

S415, calling the Viewholder (denoted as a reused Viewholder) corresponding to the item type value equal to the item type value obtained in step S411 from the Recycler cache pool, so that the Viewholder determines the item corresponding to the structure type of the data to be displayed according to the item type value.

After the step S41 is finished, the step S42 is performed: displaying the data to be displayed according to the layout information of the item corresponding to the structure type of the data to be displayed. The step S42 specifically includes: S42a, rendering the data to be displayed on the screen by the reused Viewholder according to the layout information of the determined item.

That is, when the data structure newly added to the screen is rendered, the Viewholder corresponding to the previous data in the initial part may be used for rendering, so as to implement reusing of the Viewholder.

In the list display method provided by the present disclosure, data having various structure types and items are stored firstly through the cache mechanism in the type cache pool; and when the list is displayed, the layout information of the item corresponding to the structure type of the data to be displayed is acquired according to the correspondence in the type cache pool, so as to display according to the corresponding layout information. Therefore, the present disclosure may display the list having the data of the plurality of structure types by using the same RecyclerView control. In addition, in the type cache pool, data with the same structure type and items only need to be created once, so that a phenomenon of memory waste may be avoided. When the list is pulled up or down, if the item type value corresponding to the data newly added to the screen is the same as the item type value corresponding to some data in the initial part of the list, it calls the Viewholder when the initial part of the list is displayed, and the Viewholder does not need to be created again, thereby implementing the reusing of the Viewholder.

Figure 6:
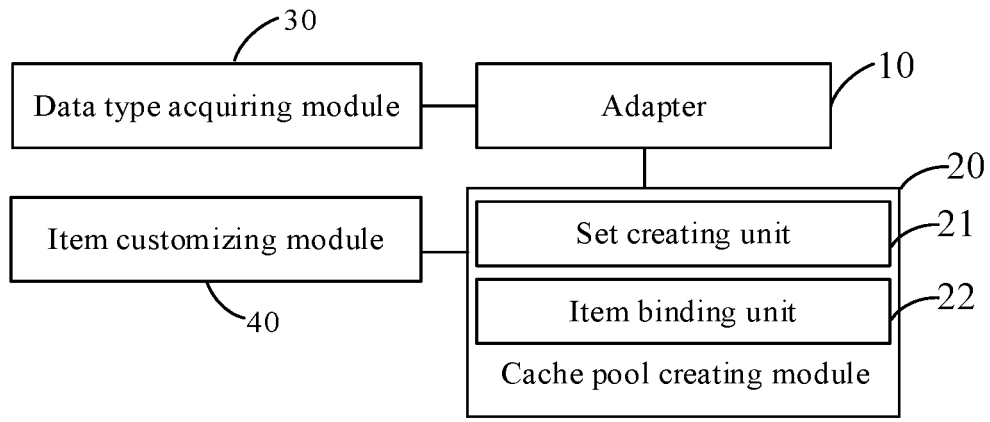
FIG. 6 is a schematic structural diagram of a list display apparatus provided by the present disclosure.

FIG. 6 is a schematic structural diagram of a list display apparatus provided in the present disclosure. As shown in FIG. 6, the list display apparatus includes: an adapter 10, a cache pool creating module 20 and a data type acquiring module 30.

The adapter 10 is configured to process data with various structure types, and may be an adapter that inherits RecyclerView.

The cache pool creating module 20 is configured to create a type cache pool, wherein the type cache pool caches: a correspondence between structure types of a plurality of data and items corresponding to the respective structure types. Layout information is recorded in each item.

The data type acquiring module 30 is configured to acquire the structure type of respective data in the list.

The adapter 10 is specifically configured to display the respective data to be displayed in a region to be displayed in the list; when each data to be displayed is displayed, the adapter is specifically configured to determine the item corresponding to the structure type of the data to be displayed according to the correspondence between the structure types of the plurality of types of data and the items corresponding to the respective structure types cached in the type cache pool; and display the data to be displayed according to the layout information of the item corresponding to the structure type of the data to be displayed. The region to be displayed is a region in the list to be displayed on the screen.

Further, the list display device further includes: an item customizing module 40 configured to customize items corresponding to the structure types of the plurality of data.

Optionally, the type cache pool further caches: a correspondence between item type values and respective items.

The cache pool creating module 20 includes: a set creating unit 21 and an item binding unit 22. The set creating unit 21 is configured to create a first cache set and a second cache set. The item binding unit 22 is configured to sequentially register and bind the structure types of the plurality of data and the items corresponding to the structure types into the first cache set. Every time the structure type of data and the item corresponding to the structure type have been registered and bound, the size of the first cache set is used as the item type value of the item, and the item and the item type value thereof are bound and then cached in the second cache set.

In addition, the type cache pool also caches: a first member method and a second member method. The first member method is: a method for obtaining corresponding items according to the item type values; the second member method is: a method for obtaining the item type value corresponding to the structure type of the data to be displayed.

Figure 7:
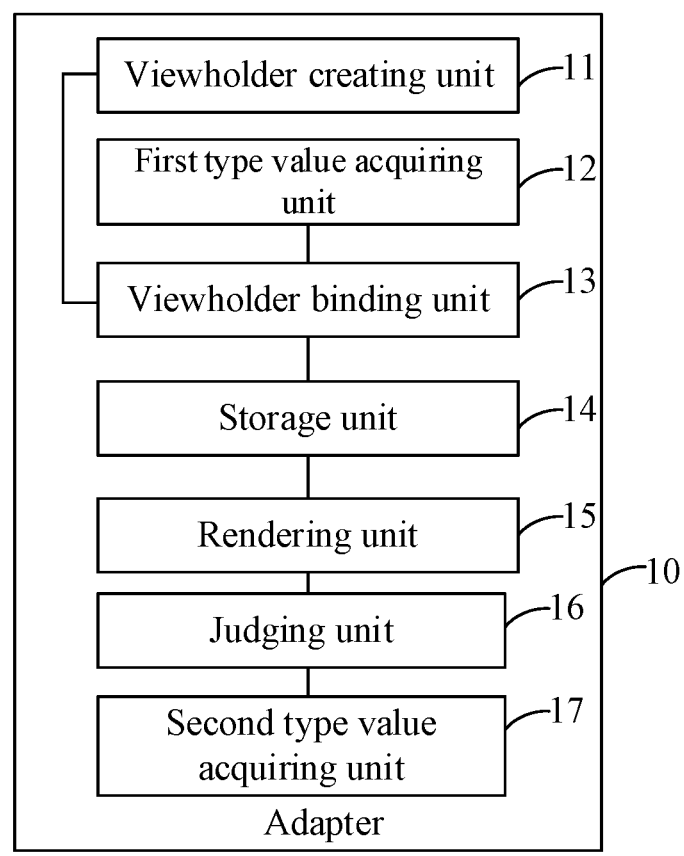
FIG. 7 is a schematic structural diagram of an adapter.

FIG. 7 is a schematic structural diagram of the adapter. As shown in FIG. 7, the adapter 10 includes: the device includes a Viewholder creating unit 11, a first type value acquiring unit 12, a Viewholder binding unit 13, a storage unit 14, a rendering unit 15, a second type value acquiring unit 17 and a judging unit 16.

The Viewholder creating unit 11 is configured to create a Viewholder corresponding to the item according to the item corresponding to the structure type of the data to be displayed, when the region to be displayed is an initial part of the list.

The first type value acquiring unit 12 is configured to acquire the item type value corresponding to the structure type of each data to be displayed according to the correspondence between the item type value and the item, when the region to be displayed is the initial part of the list.

The Viewholder binding unit 13 is configured to transmit the item type value corresponding to the structure type of the data to be displayed to the Viewholder corresponding to the data to be displayed, so as to bind the Viewholder and the item type value, when the region to be displayed is the initial part of the list.

The storage unit 14 is configured to store the Viewholder and the corresponding item type value into the Recycler cache pool after the Viewholder and the item type value are bound by the Viewholder binding unit.

The rendering unit 15 is configured to call the Viewholder corresponding to the data to be displayed, so that the Viewholder renders the data to be displayed on the screen according to the layout information of the item corresponding to the structure type of the data to be displayed. When the Viewholder renders the data to be displayed on the screen according to the layout information of the item corresponding to the structure type of the data to be displayed, the data to be displayed is rendered according to the layout information of the item corresponding to the item type value bound with the Viewholder.

The second type value acquiring unit 17 is configured to acquire the item type value corresponding to the structure type of data to be displayed when the region to be displayed is a region displayed on the screen when the list is pulled up or down; that is, when the list is pulled up or down, acquire the item type value corresponding to the structure type of the data newly added to the screen.

The judging unit 16 is configured to judge whether an item type value equal to the item type value obtained by the second type value acquiring unit 17 exists in the Recycler cache pool, when the region to be displayed is a region displayed on the screen when the list is pulled up or down; if so, the rendering unit 15 calls the Viewholder corresponding to the item type value.

The list display process and principle are described above, and are not described herein again.

As is known to a person skilled in the art, the modules or units described above in relation to FIGS. 6 and 7 may each be implemented by computer programs stored in a memory, which are executed by a processor to implement functions of respective modules or units.

The present disclosure also provides a computer device including a memory and a processor, the computer program implements the list display method as described above when executed by the processor.

The present disclosure also provides a computer-readable medium, on which a computer program is stored, the program, when executed by a processor, implements the list display method as described above.

The above memory and the computer storage medium include, but are not limited to, following readable media: random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic data storage, optical data storage, register, magnetic disk, magnetic tape, optical storage medium such as a compact disk (CD) or DVD (digital versatile disk), and other non-transitory media. Examples of processors include, but are not limited to, a general purpose processor, a central processing unit (CPU), a microprocessor, a digital signal processor (DSP), a controller, a microcontroller, a state machine, and the like.

Figure 8:
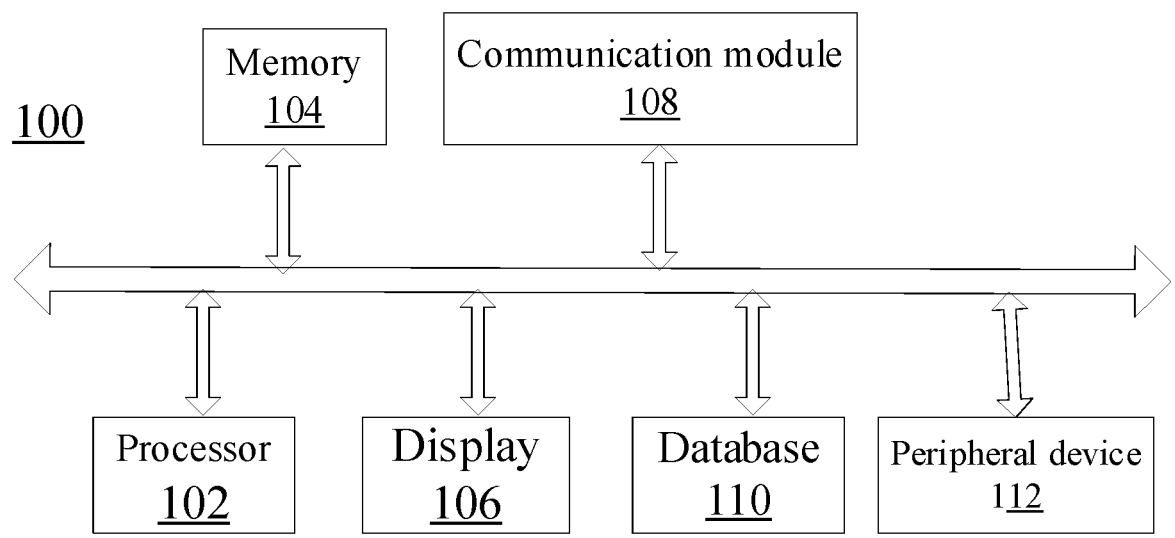
FIG. 8 is a block diagram of a computer device provided by an embodiment of the present disclosure.

For example, as shown in FIG. 8, a computer device 100 may include a processor 102, a memory 104, a display 106, a communication module 108, a database 110, and a peripheral device 112. Certain devices may be omitted and other devices may be included, for better descripting the relevant embodiments.

The processor 102 may include a plurality of cores for multi-threading or parallel processing. The processor 102 may execute computer program instructions to perform various processes. When the computer program is executed by the processor 102, the memory 104 may store computer programs for implementing various processes, such as the list display method described above.

The communication module 108 may include a specific network interface device for establishing a connection through a communication network (e.g., a television cable network, a wireless network, the internet, etc.). The database 110 may include one or more databases for storing specific data and performing specific operations (such as database searches) on the stored data. The display 106 may provide information to a user, and include, for example, any suitable type of computer display device or electronic device display such as an LCD or OLED based device. The peripheral device 112 may include various sensors and other I/O devices, such as a keyboard and a mouse.

The flowcharts and block diagrams in the drawings of the present application illustrate the architecture, functionality, and operation of possible implementations of systems, methods and computer program products according to various embodiments of the present disclosure. In this regard, each block in the flowcharts or block diagrams may represent a module, a program segment, or a portion of code, which include at least one executable instruction for implementing a specified logical function. It should also be noted that, in some alternative implementations, functions in the blocks may occur out of the order in the drawings. For example, two blocks shown in succession may, in fact, be performed substantially concurrently, or may sometimes be performed in a reverse order, depending upon the functionality involved. It will also be noted that each block of the block diagrams and/or flowcharts, and combinations of blocks in the block diagrams and/or flowcharts, may be implemented by special purpose hardware-based systems that perform the specified functions or operations, or by combinations of a special purpose hardware and computer instructions.

The units or modules in the embodiments of the present disclosure may be implemented by software or hardware. The described units or modules may also be provided in a processor. For example, respective units may be a software program provided in the computer or a mobile intelligent device, or may be a separately configured hardware device. Names of such units or modules do not constitute a limitation on the unit or module itself in some way.

For example, steps in the list display method and codes of modules, units and the like in the list display apparatus in the present disclosure may be designed based on an open API provided by google for an Android developer. For example, the present disclosure utilizes the characteristic of the data of the RecyclerView display list of the Android system, and the adapter in the present disclosure is a customized adapter which inherits the adapter in the RecyclerView and is used for processing data of various structure types.

It will be understood that the above embodiments are merely exemplary embodiments employed to illustrate the principle of the present disclosure. However, the present disclosure is not limited thereto. It will be apparent to a person skilled in the art that various changes and modifications may be made therein without departing from the spirit and scope of the present disclosure, and these changes and modifications are to be considered within the scope of the present disclosure.

What is claimed is:

1. A list display method, comprising steps of:
   creating a type cache pool, wherein the type cache pool caches: a correspondence between structure types of a plurality of types data and items corresponding to the respective structure types; and respective layout information is recorded in each item,
   acquiring the structure type of each data in a list;
   displaying the respective data to be displayed in a region to be displayed in the list, wherein the step of displaying the respective data to be displayed comprises steps of:
   determining the item corresponding to the structure type of the data to be displayed according to the correspondence between the structure types of the plurality of types of data and the items corresponding to the respective structure types cached in the type cache pool;
   displaying the data to be displayed according to the layout information of the item corresponding to the structure type of the data to be displayed;
   wherein the region to be displayed is a region to be displayed on a screen in the list,
   wherein the region to be displayed is an initial part of the list, and the step of displaying the data to be displayed according to the layout information of the item corresponding to the structure type of each data to be displayed comprises steps of:
   creating a Viewholder corresponding to the item, according to the item corresponding to the structure type of the data to be displayed; and
   calling the Viewholder corresponding to the data to be displayed so that the Viewholder renders the data to be displayed on the screen according to the layout information of the item corresponding to the structure type of the data to be displayed;
   wherein the type cache pool further caches a correspondence between the item type value and the item;
   before the step of calling the Viewholder corresponding to the data to be displayed so that the Viewholder renders the data to be displayed on the screen according to the layout information of the item corresponding to the structure type of the data to be displayed, the list display method further comprises steps of:
   obtaining the item type value corresponding to the structure type of the data to be displayed, according to the correspondence between the item type value and the item; and
   transmitting the item type value corresponding to the structure type of the data to be displayed to the Viewholder corresponding to the data to be displayed so as to bind the Viewholder and the item type value;
   wherein the Viewholder renders the data to be displayed on the screen according to the layout information of the item corresponding to the structure type of the data to be displayed, and the data to be displayed is rendered according to the layout information of the item corresponding to the item type value bound with the Viewholder; and
   wherein the step of creating a type cache pool comprises steps of:
   creating a first cache set and a second cache set; and
   sequentially registering and binding the structure types of the plurality of types of data and the items corresponding to the structure types into the first cache set;
   wherein every time the structure type of a type of data among the plurality of types of data and the item corresponding to the structure type have been registered and bound, a size of the first cache set at a current time is used as the item type value of the item, and the item and the item type value thereof are bound and then cached in the second cache set.

2. The list display method of claim 1, wherein the type cache pool is further provided with: a first member method and a second member method, and
   wherein the first member method is a method for obtaining a corresponding item according to the item type value; and the second member method is a method for obtaining the item type value corresponding to the structure type of the data to be displayed.

3. The list display method of claim 1, wherein after the step of transmitting the item type value corresponding to the structure type of the data to be displayed to the Viewholder corresponding to the data to be displayed, the list display method further comprises: storing the Viewholder and the corresponding item type value into a Recycler cache pool.

4. The list display method of claim 3, wherein the region to be displayed is a region displayed on the screen when the list is pulled up or down,
   the step of determining the item corresponding to the structure type of the data to be displayed according to the correspondence between the structure types of the plurality of types of data and the items corresponding to the respective structure types cached in the type cache pool comprises steps of:
   acquiring the item type value corresponding to the structure type of the data to be displayed;
   when the item type value equal to the item type value corresponding to the structure type of the data to be displayed exists in the Recycler cache pool, calling the Viewholder corresponding to the item type value so that the Viewholder determines the item corresponding to the structure type of the data to be displayed according to the item type value; wherein the Viewholder called in the step is denoted as a reused Viewholder;
   the step of displaying the data to be displayed according to the layout information of the item corresponding to the structure type of the data to be displayed comprises rendering the data to be displayed on the screen by the reused Viewholder according to the layout information of the determined item.

5. The list display method of claim 1, wherein prior to the step of creating a type cache pool, the list display method further comprises: customizing the items corresponding to the structure types of the plurality of types of data.

6. The list display method of claim 1, wherein the initial part is a part at a top of the list being displayed on the screen when the list is not pulled down.

7. A list display apparatus, comprising:
   a cache pool creating module configured to create a type cache pool, wherein the type cache pool caches: a correspondence between structure types of a plurality of types of data and items corresponding to the respective structure types, and respective layout information is recorded in each item;

a data type acquiring module configured to acquire the structure type of each data in the list; and an adapter configured to display the respective data to be displayed in a region to be displayed in the list; wherein when each data to be displayed is displayed, the adapter is configured to determine the item corresponding to the structure type of the data to be displayed according to the correspondence between the structure types of the plurality of types of data and the items corresponding to the respective structure types cached in the type cache pool; and display the data to be displayed according to the layout information of the item corresponding to the structure type of the data to be displayed;

wherein the region to be displayed is a region to be displayed on a screen in the list;

wherein the adapter comprises:

a Viewholder creating unit configured to create a Viewholder corresponding to the item, according to the item corresponding to the structure type of the data to be displayed, when the region to be displayed is an initial part of the list; and a rendering unit configured to call the Viewholder corresponding to the data to be displayed, so that the Viewholder renders the data to be displayed on the screen according to the layout information of the item corresponding to the structure type of the data to be displayed;

wherein the type cache pool further caches a correspondence between the item type value and the item;

the adapter further comprises:

a first type value acquiring unit configured to acquire the item type value corresponding to the structure type of each data to be displayed according to the correspondence between the item type value and the item, when the region to be displayed is the initial part of the list, a Viewholder binding unit configured to transmit the item type value corresponding to the structure type of the data to be displayed to the Viewholder corresponding to the data to be displayed so as to bind the Viewholder and the item type value, when the region to be displayed is the initial part of the list, wherein when the Viewholder renders the data to be displayed on the screen according to the layout information of the item corresponding to the structure type of the data to be displayed, the data to be displayed is rendered according to the layout information of the item corresponding to the item type value bound with the Viewholder; and wherein the cache pool creating module comprises:

a set creating unit configured to create a first cache set and a second cache set;

an item binding unit configured to sequentially register and bind the structure types of the plurality of types of data and the items corresponding to the structure types into the first cache set, wherein every time the structure type of a type of data among the plurality of types of data and the item corresponding to the structure type have been registered and bound, a size of the first cache set at a current time is used as the item type value of the item, and the item and the item type value thereof are bound and then cached in the second cache set.

8. The list display apparatus of claim 7, wherein the type cache pool further caches: a first member method and a second member method, wherein the first member method is a method for obtaining a corresponding item according to the item type value;

the second member method is a method for obtaining the item type value corresponding to the structure type of the data to be displayed.

9. The list display apparatus of claim 7, wherein the adapter further comprises:

a storage unit configured to store the Viewholder and the corresponding item type value into a Recycler cache pool after the Viewholder binding unit binds the Viewholder and the item type value;

a second type value acquiring unit configured to acquire the item type value corresponding to the structure type of data to be displayed when the region to be displayed is a region being displayed on the screen when the list is pulled up or down;

a judging unit configured to judge whether an item type value equal to the item type value obtained by the second type value acquiring unit exists in the Recycler cache pool, when the region to be displayed is a region being displayed on the screen when the list is pulled up or down; if so, the rendering unit calls the Viewholder corresponding to the item type value.

10. The list display apparatus of claim 7, wherein the list display apparatus further comprises: an item customizing module configured to customize items corresponding to the structure types of the plurality of types of data.

11. The list display apparatus of claim 7, wherein the initial part is a part at a top of the list being displayed on the screen when the list is not pulled down.

12. A computer device comprising a memory and a processor, the memory having stored thereon a computer program, wherein the computer program, when executed by the processor, implements the list display method of claim 1.

13. A non-transitory computer-readable medium having stored thereon a computer program, wherein the computer program, when executed by a processor, implements the list display method of claim 1.

14. The non-transitory computer-readable medium of claim 13, wherein the region to be displayed is an initial part of the list, and the step of displaying the data to be displayed according to the layout information of the item corresponding to the structure type of each data to be displayed comprises steps of:

creating a Viewholder corresponding to the item, according to the item corresponding to the structure type of the data to be displayed; and calling the Viewholder corresponding to the data to be displayed so that the Viewholder renders the data to be displayed on the screen according to the layout information of the item corresponding to the structure type of the data to be displayed.

\* \* \* \* \*